(12) United States Patent
Ito

(10) Patent No.: US 7,491,352 B2
(45) Date of Patent: Feb. 17, 2009

(54) METHOD FOR PREPARING AN ELECTRODE MATERIAL FOR A POLARIZED ELECTRODE

(76) Inventor: Junji Ito, Kuru 102, 67, Oji 3-chome, Komaki-shi, Aichi 485-0832 (JP)

( * ) Notice: Subject to any disclaimer, the term of this patent is extended or adjusted under 35 U.S.C. 154(b) by 416 days.

(21) Appl. No.: 10/502,905

(22) PCT Filed: Jan. 28, 2003

(86) PCT No.: PCT/JP03/00781

§ 371 (c)(1),
(2), (4) Date: Dec. 13, 2004

(87) PCT Pub. No.: WO03/065391

PCT Pub. Date: Aug. 7, 2003

(65) Prior Publication Data

US 2005/0116375 A1 Jun. 2, 2005

(30) Foreign Application Priority Data

Jan. 29, 2002 (JP) ............................. 2002-020454

(51) Int. Cl.
*C04B 35/00* (2006.01)
*H01B 1/24* (2006.01)
(52) U.S. Cl. .................. 264/105; 264/122; 264/128
(58) Field of Classification Search ................ None
See application file for complete search history.

(56) References Cited

U.S. PATENT DOCUMENTS

| 4,327,400 | A | | 4/1982 | Muranaka et al. | |
|---|---|---|---|---|---|
| 4,717,595 | A | * | 1/1988 | Watanabe et al. | ........... 427/221 |
| 6,207,264 | B1 | * | 3/2001 | Robinson et al. | ......... 428/304.4 |
| 6,246,568 | B1 | | 6/2001 | Nakao | |
| 6,282,081 | B1 | | 8/2001 | Takabayashi | |
| 6,339,528 | B1 | * | 1/2002 | Lee et al. | .................... 361/502 |
| 6,507,479 | B2 | * | 1/2003 | Saito et al. | ................. 361/502 |
| 6,616,875 | B2 | * | 9/2003 | Lee et al. | .................... 264/105 |
| 6,902,701 | B1 | * | 6/2005 | Hughes et al. | ................ 422/83 |

FOREIGN PATENT DOCUMENTS

| JP | 56-55029 A | 5/1981 |
|---|---|---|
| JP | 62-52447 B2 | 11/1987 |
| JP | 08-055761 A | 2/1996 |
| JP | 11-102843 A | 4/1999 |
| JP | 11-102844 A | 4/1999 |
| JP | 11-329904 A | 11/1999 |

OTHER PUBLICATIONS

Supplementary European Search Report, dated Jul. 20, 2007, for Application EP 03 73 4860.

* cited by examiner

*Primary Examiner*—Edmund H. Lee
(74) *Attorney, Agent, or Firm*—Knobbe, Martens, Olson & Bear, LLP

(57) ABSTRACT

The present invention provides polarized electrodes that ensure a satisfactory packing ratio of activated carbon particles and conductive particulates and favorable contact between these and an electrolyte, and demonstrate high capacitance. The present invention relates to the following electrode materials for polarized electrodes:
(1) electrode materials for polarized electrodes containing a rubber-based emulsion, activated carbon particles, conductive particulates, and a surfactant; and
(2) electrode materials for polarized electrodes containing a dispersion of polytetrafluoroethylene, activated carbon particles, conductive particulates, and a surfactant, wherein the solid content is 25% by weight or more.

8 Claims, 2 Drawing Sheets

METHOD FOR PREPARING AN ELECTRODE MATERIAL FOR A POLARIZED ELECTRODE

This application is the U.S. National Phase under 35 U.S.C. 371 of International Application PCT/JP03/00781, filed on January 28, 2003, which claims priority based on JP 2002-20454, filed on January 29, 2002. This International Application was not published under PCT Article 21(2) in English.

TECHNICAL FIELD

The present invention relates to electrode materials for preparing polarized electrodes (hereinafter, simply referred to as "electrode materials"), methods for preparing the same, and polarized electrodes using the electrode materials.

BACKGROUND OF THE INVENTION

Conventionally, carbon electrodes containing activated carbon particles are used as polarized electrodes for electric double layer capacitors. The carbon electrodes are generally manufactured by applying electrode materials containing activated carbon particles onto a conductive substrate, and drying the laminate. A currently known method for manufacturing polarized electrodes includes applying onto a conductive substrate electrode materials obtained by dispersing activated carbon particles, conductive particulates, etc. in a dispersion of polytetrafluoroethylene (referred to as "PTFE", hereinafter) as a binder; and drying the laminate.

The capacitance of an electric double layer capacitor varies depending on the area (effective area) where the activated carbon particles and the conductive particulates contained in the polarized electrodes contact with the electrolyte. More specifically, the capacitance is closely related to the packing ratio of the activated carbon particles and conductive particulates in the polarized electrodes. Therefore, to increase the capacitance, the packing ratio of the activated carbon particles and conductive particulates needs to be improved.

In a slurry method which includes dispersing activated carbon particles, conductive particulates, a binder, etc. in a dispersion medium to prepare slurry-like electrode materials; and forming an electrode layer of the polarized electrode using the same, the capacitance of a polarized electrode is generally proportional to the solid content of the electrode materials. Therefore, to increase the capacitance of the polarized electrode, electrode materials with high solid content need to be prepared in the slurry method.

In general, however, the electrode materials with high solid content cannot exhibit favorable application properties in many cases since such electrode materials are thickened due to a high degree of interaction between the binder and the solid content, such as activated carbon particles, conductive particulates, etc. For example, according to the conventional slurry method, when the solid content is 25% by weight or more, the viscosity of the electrode materials is about 6,000 cP (the viscosity being measured under atmospheric conditions at 25° C. with a Brookfield viscometer). Thus, a high viscosity makes it difficult to demonstrate good application properties.

Therefore, in the slurry method, the solid content of the electrode materials in view of ease of preparation, ease of applying, etc. is preferably adjusted to be about 20% by weight.

In recent years, lightweight and miniaturized polarized electrodes have been demanded, and thus the development of high capacity polarized electrodes for lightweight and miniaturized designs is called for. Thus, it is desired to produce practical polarized electrodes using electrode materials with a solid content of about 30% by weight. The development of electrode materials with low viscosity and excellent application properties (e.g., slurry flowability) even when the solid content thereof is 30% by weight or more needs to be realized.

DISCLOSURE OF THE INVENTION

A main object of the present invention is to provide polarized electrodes that ensure a favorable packing ratio of the activated carbon particles and conductive particulates to be contained in the polarized electrodes and satisfactory contact between these and the electrolyte, and demonstrate excellent capacitance.

The inventor carried out intensive research in view of the above-described problems of the prior art and as a result found that the above object can be achieved by preparing specifically-structured electrode materials using particular materials in a specific procedure to accomplish the present invention.

The present invention relates to the following electrode materials, methods for preparing the same, and polarized electrodes using the electrode materials.

1. An electrode material for a polarized electrode containing a rubber-based emulsion, activated carbon particles, conductive particulates, and a surfactant.

2. An electrode material for a polarized electrode containing a dispersion of polytetrafluoroethylene, activated carbon particles, conductive particulates, and a surfactant, wherein the solid content is 25% by weight or more.

3. An electrode material for a polarized electrode according to Item 1, wherein a rubber component of the rubber-based emulsion is at least one member selected from the group consisting of butyl rubber, natural rubber, butadiene rubber, isoprene rubber, nitrile rubber, acrylic rubber, chloroprene rubber, ethylene-propylenediene rubber, styrene-butadiene rubber, and carboxy styrene-butadiene rubber.

4. A method for preparing an electrode material for a polarized electrode, the method comprising:

a first step of dispersing conductive particles and a surfactant in water;

a second step of dispersing activated carbon particles in the dispersion obtained in the first step; and a third step of mixing a rubber-based emulsion or a dispersion of polytetrafluoroethylene in the dispersion obtained in the second step.

5. A preparation method according to Item 4, wherein at least two types of activated carbon particles with different mean particle diameters are used.

6. A preparation method according to Item 5, wherein the at least two types of activated carbon particles are dispersed in the dispersion in the second step in the order such that the type of activated carbon particles with the smallest mean particle diameter is dispersed first, and then a) the other type of activated carbon particles is dispersed or b) the other types of activated carbon particles are dispersed in order of their increasing mean particle diameter.

7. An electrode material for a polarized electrode prepared by a method according to Item 4.

8. A polarized electrode obtained by forming an electrode layer on a conductive substrate using an electrode material for a polarized electrode according to any one of Items 1 to 3 and 7.

Hereinafter, electrode materials, preparation methods thereof, and polarized electrodes of the present invention will be described in detail.

Electrode Materials of the Invention

Electrode materials of the invention include the following two types of electrode material:
(1) electrode materials of the first aspect of the invention containing a rubber-based emulsion, activated carbon particles, conductive particulates, and a surfactant; and
(2) electrode materials of the second aspect of the invention containing a dispersion of PTFE, activated carbon particles, conductive particulates, and a surfactant, wherein the solid content is 25% by weight or more.

The rubber-based emulsion contained in the electrode materials of the first aspect of the invention and the PTFE dispersion contained in the electrode materials of the second aspect of the invention serve as binders.

Hereinafter, ingredients constituting the electrode material of the invention will be described.

Binder

A rubber-based emulsion (the first aspect of the invention) or a PTFE dispersion (the second aspect of the invention) is used as a binder for the electrode materials of the present invention.

Any rubber-based emulsion can be used without limitation as long as it functions as a binder. Preferably, for example, a rubber-based emulsion is obtained by dispersing water in a known rubber solution and then emulsifying the dispersion.

Rubber components contained in the rubber-based emulsion are not limited, and can be selected from known rubbers according to the desired characteristics of the electrode materials. Examples of rubbers include, for example, butyl rubber, natural rubber, butadiene rubber, isoprene rubber, nitrile rubber, acrylic rubber, chloroprene rubber, ethylene-propylene-diene rubber, styrene-butadiene rubber, carboxy styrene-butadiene rubber, etc. Such rubbers can be used singly or in combination.

Due to the combination of the electrolyte with which a polarized electrode contacts, certain types of rubber may expand on contact with the electrolyte, resulting in reduced rubber porosity. Therefore, it is preferable to select rubbers with a swelling resistance against the electrolyte (i.e., solubility resistance against the electrolyte) considering the type of electrolyte to be used. For example, butyl rubber, ethylene propylene diene rubber, etc., which have excellent solubility resistance against propylene carbonate, are preferably selected when an electrolyte containing propylene carbonate is used.

In general, the rubber-based emulsion can be prepared by dissolving rubber in a suitable solvent, dispersing water in the obtained rubber solution, and emulsifying the dispersion. Solvents can be appropriately selected according to the type of rubber without limitation as long as rubber components can be dissolved. For example, toluene is suitably used for butyl rubber, ethylene propylene diene rubber, etc. Cyclohexane is suitable for natural rubber, nitrile rubber, etc.

The amount of solvent can be suitably adjusted according to the rubber type within the range that the rubber components can be sufficiently dissolved. The amount of water to be dispersed in the rubber solution is not limited, and can be appropriately adjusted depending on the desired characteristics of the rubber-based emulsion.

For emulsification, a kneader, mixer, homogenizer, etc. (hereinafter, referred to as "a known stirrer") can be used. The solid-content (amount of rubber) of the rubber-based emulsion is not limited, and is generally about 30 to about 80% by weight, and preferably about 40 to about 60% by weight.

Any PTFE dispersion can be used without limitation as long as it functions as a binder, and known PTFE dispersions can be used. The present invention preferably employs a dispersion obtained by mixing about 150 to about 250 parts by weight of water, and preferably about 180 to about 220 parts by weight of water, with 100 parts by weight of PTFE, and stirring the mixture to form a dispersion. The mean particle diameter of PTFE is not limited, but is preferably about 0.2 to about 0.3 μm. A known stirrer can be used for stirring PTFE and water.

The content of the binder (rubber-based emulsion or PTFE dispersion) in the electrode materials is not limited, and is generally adjusted so that the rubber or PTFE amount (solid-content) is about 4 to about 10% by weight, and preferably about 5 to about 7% by weight, per 100% by weight of the electrode material.

Activated Carbon Particles

Any activated carbon particles can be used without limitation, and known activated carbon particles for use in carbon electrodes, etc. can be used. Activated carbon particles obtained by activating coconut husks, wood flour, petroleum pitch, phenol resin, etc. using vapors, various agents, alkalis, etc. can be mentioned, for example. Such kinds of activated carbon particles can be used singly or in combination.

The mean particle diameter of the activated carbon particles is not limited, but is usually about 0.5 to about 50 μm, and preferably about 2 to about 30 μm.

The content of activated carbon particles in the electrode material is not limited and is usually about 70 to about 90% by weight, and preferably about 85 to about 90% by weight, per 100% by weight of the electrode material.

Conductive Particulates

Any conductive particulates can be used without limitation, and usable is at least one member selected from the group, used as conductive particulates in carbon electrodes, etc., consisting of known carbon-based particles, conductive polymer particles, and metal particles.

Examples of conductive particulates include, for example, carbon-based particles, such as carbon black (e.g., acetylene black, acetylene black containing boron in a molecule, ketjenblack, etc.), graphite, mesophase carbon, carbon nanotubes, etc.; conductive polymer particles, such as polyacetylene, polyparaphenylene, polyphenylene vinylene, polypyrrole, polyaniline, etc.; metal particles, such as aluminium, tantalum, titanium, nickel, vanadium oxide, ruthenium oxide, titanium nitride, potassium manganate, cobalt acid lithium, etc. Such kinds of conductive particulates can be used singly or in combination.

The mean particle diameter of the conductive particulates can be appropriately determined without limitation within the range of 0.01 to 20 μm according to the type of conductive particulates as follows: the carbon-based particles are preferably adjusted to about 0.5 to about 20 μm, and more preferably about 1 to about 15 μm; the conductive polymer particles are preferably adjusted to about 0.05 to about 20 μm, and more preferably about 0.1 to about 3 μm; and the metal particles are preferably adjusted to about 0.01 to about 10 μm, and more preferably about 0.05 to about 1 μm.

The content of conductive particulates in the electrode materials is not limited and is generally about 5 to about 10% by weight, and preferably about 6 to about 8% by weight, per 100% by weight of the electrode material.

Surfactant

The surfactant used may be selected from known surfactants, including anionic surfactants, cationic surfactants, amphoteric surfactants, and nonionic surfactants.

Examples of anionic surfactants include fatty acid sodium salts, fatty acid potassium salts, sodium alkylbenzenesulfonates, sodium alkylsulfonates, carboxymethylcellulose (CMC), CMC ammonium, triethanolamine, ammonium alkylbenzenesulfonates, sodium alkylsulfonates, etc.

Examples of cationic surfactants include alkyltrimethyl ammonium chlorides, alkyldimethylbenzyl ammonium chlorides, etc.

Examples of amphoteric surfactants include alkyl betaines, amide betaine, etc.

Examples of nonionic surfactants include sucrose fatty acid esters, polyoxyethylene alkyl ethers, polyvinyl alcohol, polyvinyl pyrrolidone, etc.

Among the above-mentioned surfactants, polyvinyl alcohol, polyvinyl pyrrolidone, and carboxymethylcellulose may be preferably used in the present invention.

In general, the surfactant is appropriately selected from the above depending on the type of charge on the surface of the conductive particulates contained in the electrode materials as follows: anionic surfactants are preferable when the charge of the surface of conductive particulates is acidic (negative); and cationic surfactants are preferred when the surface charge is alkaline (positive).

The content of the surfactant in the electrode materials is not limited, and is generally about 0.1 to about 5% by weight, and more preferably about 0.5 to about 2% by weight per 100% by weight of the electrode material.

Other Ingredients (Additives, etc.)

The electrode material of the invention may contain water in addition to the above-mentioned essential ingredients. Various additives may be contained within the range that does not adversely affect the effects of the electrode materials of the invention.

Distilled water is preferably used as water. Water contained in the invention may be distinguished as water as a binder component, and water which can be added as needed so as to adjust the solid-content (i.e., viscosity) of the electrode materials, etc.

Additives can be used without limitation, and, for example, fillers, adhesion enhancement agents, rubber antidegradants, rubber crosslinking agents, rubber crosslinking accelerators, etc. can be mentioned.

Examples of fillers include silica, zinc oxide, magnesium oxide, magnesium carbonate, wollastonite, diatomaceous earth, mica, calcium carbonate, aluminium hydroxide, alumina, magnesium hydroxide, clay, talc, wood flour, pulp, etc. Fillers are added generally in an amount of about 0.5 to about 5 parts by weight per 100 parts by weight of the rubber (solid content) contained in the electrode materials.

Examples of adhesion enhancement agents include stearic acid, polyacrylic acid, vinyl acetate, polyvinyl alcohol, etc. The adhesion enhancement agents are usually added in an amount of about 1 part by weight per 100 parts by weight of the rubber (solid-content) contained in the electrode materials.

Examples of rubber antidegradants include 2,6-di-t-butyl-4-methylphenol (BHT), 2,2'-methylenebis-(4-methyl-6-t-butylphenol) (MBMBP), etc. The rubber antidegradants are usually added in an amount of about 0.5 parts by weight per 100 parts by weight of the rubber (solid-content) contained in the electrode materials.

Examples of rubber crosslinking agents include resin crosslinking agents, sulfur crosslinking agents, oxime crosslinking agents, metal crosslinking agents, etc. The rubber crosslinking agents are usually added in an amount of about 1 to about 2 parts by weight per 100 parts by weight of the rubber (solid-content) contained in the electrode materials.

Examples of rubber crosslinking accelerators include N,N-diphenylguanidine (DPG), tetrabutylthiuram disulfide (TBTD), tetramethylthiuramdisulfide (TMTD), tetramethylthioperoxydicarboxylic acid diamide (TMTM), dipentamethylenethiuramtetrasulfide (DPTT), zinc phenyldithiocarbamate (ZnPDC), zinc dimethyldithiocarbamate (ZnMDC), zinc dibutyldithiocarbamate (ZnBDC), 2-mercaptobenzothiazole (MBT), dibenzothiazyldisulfide (MBTS), N-cyclohexylbenzothiazyl-2-sulfenic amide (CBS), N-t-butylbenzothiazyl-2-sulfenic amide (BBS), N-cyclohexylthiophthalimide (CPT), N-butyraldehyde aniline (BAA), zinc white, etc. The rubber crosslinking accelerators are usually added in an amount of about 1 to about 2 parts by weight per 100 parts by weight of the rubber (solid-content) contained in the electrode materials.

Preparation Method of the Electrode Materials of the Invention

Methods for preparing the electrode materials of the first aspect of the invention are not limited as long as a rubber-based emulsion, activated carbon particles, conductive particulates, and a surfactant are contained in the electrode materials. For example, the electrode materials can be prepared by mixing these ingredients (to which the above-mentioned additives maybe added) and stirring the mixture to make it uniform.

Methods for preparing the electrode materials of the second aspect of the invention are not limited as long as the electrode materials contain a PTFE dispersion, activated carbon particles, conductive particulates and a surfactant, and the solid content is 25% by weight or more. For example, the electrode materials can be prepared by mixing these ingredients (to which the above-mentioned additives may also be added) and stirring the mixture to make it uniform. Water may be added thereto or it may be warmed as needed so as to have a desired solid content.

The above-mentioned ingredients can be used in either preparation method. The mixing ratio of each ingredient may be determined considering the above-described suitable content range of each ingredient per 100% by weight of the electrode material. A known stirrer can be used for stirring each ingredient.

As is clear from the above description, there is no limitation to the methods for preparing electrode materials of the invention. In particular, an electrode material fully capable of improving the capacitance of a polarized electrode can be prepared according to a specific preparation method comprising the following three steps:

(1) a first step of dispersing conductive particulates and a surfactant in water;

(2) a second step of dispersing activated carbon particles in the dispersion obtained in the first step; and (3) a third step of mixing a rubber-based emulsion or a PTFE dispersion to the dispersion obtained in the second step.

Hereinafter, the preparation method comprising the above-described three steps is referred to as "the preparation method of the invention".

The preparation method of the invention is characterized by mixing each ingredient constituting the electrode material in a specific order. Each step is now described.

In the first step, conductive particulates and a surfactant are dispersed in water.

The mixing rate of the conductive particulates and a surfactant to water can be appropriately determined without limitation according to the type of each ingredient, desired characteristics of electrode materials, etc. In general, in 100 parts by weight of water, the conductive particulates may be dispersed in an amount of about 20 to about 30 parts by weight, and preferably about 25 to about 30 parts by weight. The surfactant is dispersed in the same amount of water in an amount of about 0.1 to about 0.5 parts by weight, and preferably about 0.2 parts by weight.

The order of dispersing conductive particulates and a surfactant is not limited, and either may be added first. A known stirrer can be used for dispersion.

In the second step, activated carbon particles are dispersed in the dispersion obtained in the first step.

Any activated carbon particles can be used without limitation. In particular, at least two types of activated carbon particles with different mean particle diameters are preferably used in the preparation method of the invention. The viscosity of the electrode materials obtained using at least two types of activated carbon particles with different mean particle diameters can be reduced more compared to the case where activated carbon particles with a single mean particle diameter are used.

The two or more types of activated carbon particles with different mean particle diameters are preferably classified as follows: assuming the smallest mean particle diameter to be "A", the second smallest mean particle diameter should be about "3A"; and the third smallest mean particle diameter should be about "9A". For example, when the kind of activated carbon particles of the smallest mean particle diameter are of 3 μm size, the kind of activated carbon particles of the second smallest mean particle diameter are of about 9 μm size.

The mixing ratio of the activated carbon particles with different mean particle diameters is not limited. In general, these are mixed in about equal proportions, or the kind of activated carbon particles with the smallest mean particle diameter may be included in excess by about 10 to 50% by weight as compared to the other activated carbon particles.

In the second step, it is preferable to disperse the two or more types of activated carbon particles with different mean particle diameters in the dispersion obtained in the first step in such a manner that the type of the activated carbon particles with the smallest mean particle diameter is dispersed first, and then a) the other type of activated carbon particles is dispersed or b) the other types of activated carbon particles are dispersed in order of their increasing mean particle diameter.

The activated carbon particles may be dispersed in an amount of about 200 to about 300 parts by weight, and preferably about 200 to about 250 parts by weight, per 100 parts by weight of the dispersion obtained in the first step.

In the third step, a rubber-based emulsion or PTFE dispersion (binder) is mixed in the dispersion obtained in the second step.

The binder is usually mixed in an amount of about 5 to about 10 parts by weight, and preferably about 5 to about 6 parts by weight, per 100 parts by weight of the dispersion obtained in the second step. The mixing ratio of the binder can be suitably adjusted depending on the desired characteristics of the electrode material, and is not necessarily limited to the above-mentioned range.

When the preparation method of the invention is adopted as a method for preparing the electrode materials of the second aspect of the invention, the mixing ratio of the binder, water, etc. can be appropriately adjusted so that the solid content of the electrode material becomes 25% by weight or more.

In the preparation method of the invention, conductive particulates and a surfactant are dispersed in water prior to the activated carbon particles. Thus, the viscosity of the electrode materials can be reduced by 1,000 cP (viscosity measured under atmospheric conditions at 25° C. with a Brookfield viscometer) as compared with electrode materials prepared by the conventional method in which the same amounts of all ingredients are dispersed at once.

In the second step of the preparation method of the invention, the viscosity of the electrode material can be reduced more efficiently when the two or more types of activated carbon particles with different mean particle diameters are dispersed in such a manner that the type of the activated carbon particles with the smallest mean particle diameter is dispersed first and then a) the other type of activated carbon particles is dispersed or b) the other types of activated carbon particles are dispersed in order of their increasing mean particle diameter. For example, the viscosity of the electrode material to be obtained can be reduced by about 800 cP (viscosity measured under atmospheric conditions at 25° C. with a Brookfield viscometer) as compared to the case where an equivalent amount of activated carbon particles of a single mean particle diameter are used.

The preparation method of the invention allows activated carbon particles to be dispersed at high densities. Thus activated carbon particles in the same amount as the prior art can be dispersed in a dispersion medium of 80 to about 95% by weight of the minimum amount required to maintain a fluid state in the electrode materials prepared by known methods, without gelling (critical amount of electrode materials to maintain flowability). As a result, an electrode material with low viscosity compared to that obtained by the prior art can be prepared even if the solid content is the same.

As is clear from the above, due to the attempt to reduce the viscosity of electrode materials, electrode materials with excellent application properties (e.g., slurry flowability) can be prepared compared to conventional electrode materials even with the same solid content, thereby readily preparing polarized electrodes with high capacitance.

Polarized Electrode of the Invention

The polarized electrodes of the invention can be produced by forming an electrode layer on a conductive substrate using the electrode materials of the invention.

Known materials usable as collectors in carbon electrodes, etc. are preferably used as conductive substrates. For example, aluminium, nickel, copper, stainless steel, titanium, conductive rubber, etc. can be mentioned. The conductive substrate can be in any shape, such as a rod-like, sheet-like, etc.

The surface of the conductive substrate may be roughened beforehand by acid treatment, alkali treatment, blast treatment, etc. A roughened surface can ensure increased adhesion to the electrode layer. The surface area is consequently increased, thereby improving the current collection effect. Effective ways to improve output by increasing adhesion to the electrode layer, in addition to surface roughening, include forming a colloidal carbon thin layer on the conductive substrate surface using water glass as a binder, and a thin layer formed of silane coupling, titanium coupling, etc.

The electrode layer can be formed on the conductive substrate by any method without limitation, such as application methods (brush coating, spraying, roller, etc.), the doctor blade method, dipping, etc. The thickness of the electrode layer can be appropriately determined depending on the use of the finished product, the type of conductive substrate, etc. and is generally about 50 to about 250 μm, and preferably about 100 to about 200 μm.

After forming an electrode layer, the electrode layer may be pressurized as long as the contact between the electrolyte, and the activated carbon particles and conductive particulates is not impaired. Pressurization treatment can be easily carried out by a press roller, hydraulic press, etc. The pressurization treatment can further ensure an increase in the packing ratio of the activated carbon particles and conductive particulates.

The electrode layer can be dried by any method without limitation, such as natural drying, drying by heating, etc. In order to ensure an adequate porosity of the electrode layer, a short drying period is preferable (e.g., for one to two minutes at 200° C.).

When a rubber crosslinking agent is contained in the electrode materials, it is preferable to perform the heat-treatment for crosslinking after drying (preferably, vacuum drying or drying under an inert gas). The heat-treatment temperature for crosslinking is not limited, and is in general preferably about 150 to about 200° C. The heating period can be suitably adjusted depending on the temperature.

Function

According to the preparation method of the invention, conductive particulates and a surfactant are dispersed in water in the first step, and activated carbon particles are dispersed in the second step. In this order of dispersion, electric interaction occurs preferentially between the surfactant and conductive particulates and further electric repulsion occurs between the conductive particulates. As a result, the autoagglutination of the conductive particulates can be efficiently suppressed. However, the detailed mechanism of this phenomenon is not yet known. In the electrode materials obtained by the preparation method of the invention, aggregation and sedimentation of conductive particulates are suppressed at least one month, and thus it can be expected that a certain electric repulsion interaction occurs between the conductive particulates.

The detailed mechanism of this interaction is not yet known. It is conceivable that aggregation and sedimentation of conductive particulates are suppressed since hydrophobic groups of the surfactant adsorb on the conductive particulate surfaces and the hydrophilic groups oriented to the water repel one another (FIG. 2).

Subsequently, the conductive particulates, to which the surfactant is uniformly adsorbed, uniformly cover the surfaces of the activated carbon particles to be dispersed in the second step, and the binder interlinks through the surrounding medium. In the above-mentioned structure, water is present between the binder and the activated carbon particles, and favorable voids can be formed after drying, thereby increasing the contact of the electrolyte, with the activated carbon particles and conductive particulates.

Effects

According to the preparation method of the invention, the viscosity of the electrode material can be sharply reduced compared to the conventional electrode materials, even if the solid-content is the same.

The electrode materials of the invention can produce polarized electrodes that can ensure a favorable packing ratio of the activated carbon particles and conductive particulates contained therein and an excellent contact between these and the electrolyte, and show superior capacitance as compared to conventional polarized electrodes.

The polarized electrode of the invention obtained by forming the electrode layer on a conductive substrate using the electrode materials of the present invention has a capacitance as much as about 2 to 3 times that of conventional polarized electrodes.

The polarized electrode of the invention having such characteristics is particularly useful for a polarized electrode of an electric double layer capacitor.

Figure 1:
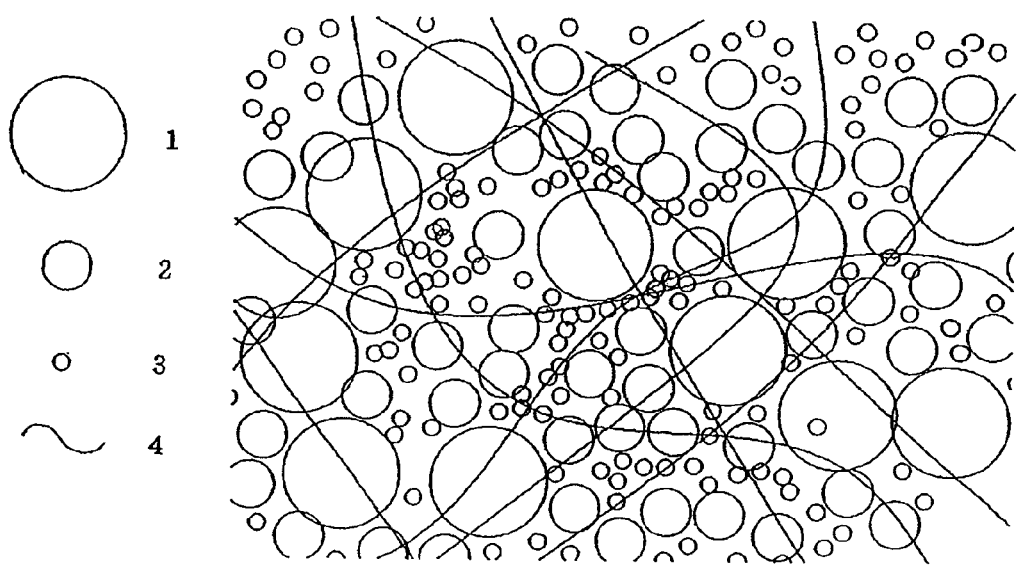
FIG. 1 is a view schematically illustrating the structure of a prior-art electrode material.
Figure 2:
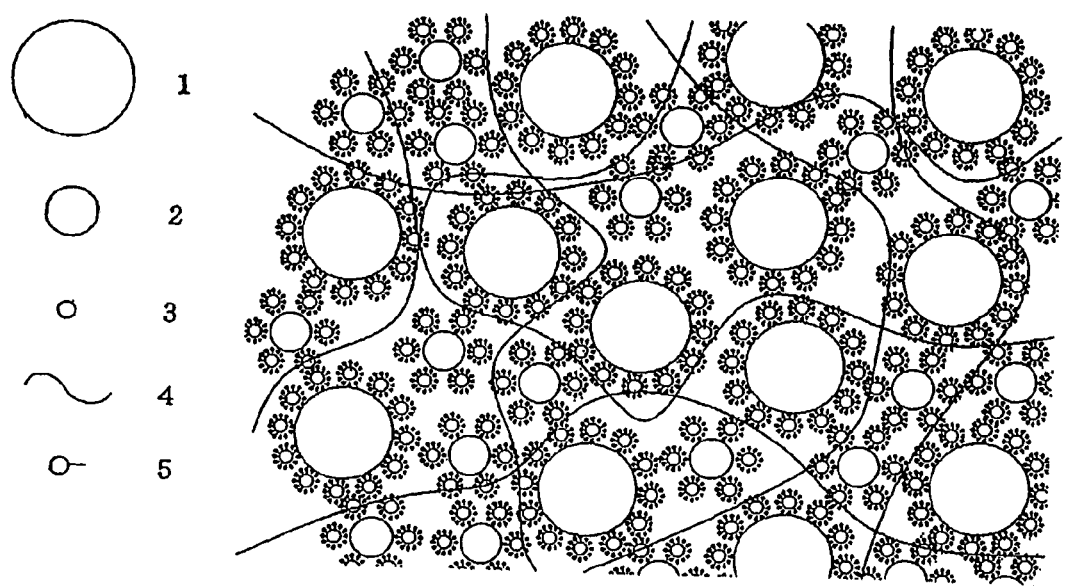
FIG. 2 is a view schematically illustrating the structure of an electrode material of the invention.

DESCRIPTION OF REFERENCE NUMERALS 1. activated carbon particle
2. activated carbon particle
3. conductive particulate
4. binder
5. surfactant

BEST MODE FOR CARRYING OUT THE INVENTION

The present invention will be described below in further detail with reference to Examples and Comparative Examples. However, the scope of the invention is not limited to these Examples.

PREPARATORY EXAMPLE

Ingredients were mixed in the amounts shown in Table 1 to prepare five types of electrode materials, referred to as samples 1 to 5. Subsequently, the viscosity and state of the electrode materials of the samples 1 to 5 were examined. The viscosity of the electrode materials was measured under atmospheric conditions at 25° C. with a Brookfield viscometer (the same applies to Table 2). The state of the electrode materials was observed visually.

"BP-20" (trade name, product of Kuraray Chemical, Inc.) was used as activated carbon particles. "DENKA BLACK" (trade name, product of DENKI KAGAKU KOGYO K.K.) was used as the conductive particulates.

In Table 1, PTFE denotes "PTFE dispersion"

TABLE 1

| | Binder | Activated carbon 1 | Activated carbon 2 | Conductive particulates | Surfactant | Water | Mixing method | Viscosity (cP) | State |
|---|---|---|---|---|---|---|---|---|---|
| Mixing ratio | 10 (solid content) | 35 | 35 | 20 | 0.2 | 250 | | | |
| Sample 1 | PTFE | particle diameter 30 μm | particle diameter 30 μm | DENKA BLACK | — | distilled water | 1 | 6,100 | semisolid |

TABLE 1-continued

|  | Binder | Activated carbon 1 | Activated carbon 2 | Conductive particulates | Surfactant | Water | Mixing method | Viscosity (cP) | State |
|---|---|---|---|---|---|---|---|---|---|
| Sample 2 | PTFE | particle diameter 30 μm | particle diameter 30 μm | DENKA BLACK | CMC | distilled water | 1 | 5,512 | viscous liquid |
| Sample 3 | PTFE | particle diameter 30 μm | particle diameter 30 μm | DENKA BLACK | CMC | distilled water | 2 | 4,034 | viscous liquid |
| Sample 4 | PTFE | particle diameter 15 μm | particle diameter 30 μm | DENKA BLACK | CMC | distilled water | 2 | 3,130 | viscous liquid |
| Sample 5 | PTFE | particle diameter 15 μm | particle diameter 30 μm | DENKA BLACK | CMC | distilled water | 3 | 2830 | viscous liquid |

Description of Mixing Methods

Mixing method 1 is the method in which all ingredients are dispersed at once.

Mixing method 2 includes dispersing conductive particulates and a surfactant beforehand in water, subsequently dispersing activated carbon particles in the resultant dispersion, and then dispersing a binder therein. Either conductive particulates or a surfactant may be dispersed first.

Mixing method 3 is applied to the case where two or more types of activated carbon particles with different mean particle diameters are used as activated carbon particles according to mixing method 2. In mixing method 3, the activated carbon particles are dispersed in the dispersion in the order such that the type of activated carbon particles with the smallest mean particle diameter is dispersed first and then a) the other type of activated carbon particles is dispersed or b) the other types of activated carbon particles are dispersed in order of their increasing mean particle diameter.

Results of Table 1

Sample 2 containing a surfactant showed further reduced viscosity as compared with the conventional electrode material (sample 1) containing no surfactant and obtained by dispersing the ingredients all at once.

Sample 3 showed further reduced viscosity as compared with the sample 2. Sample 3 contained the same ingredients as in the sample 2 but was obtained in a different dispersion order such that conductive particulates and a surfactant were dispersed beforehand in water, and then activated carbon particles were dispersed in the resultant dispersion.

Sample 4, obtained by using the same dispersion order as in sample 3, showed further reduced viscosity as compared with the sample 3 due to the use of two or more types of activated carbon particles with different mean particle diameters.

Sample 5 showed further reduced viscosity as compared to Sample 4, which was produced by gradually dispersing the various activated carbon particles in the dispersion in order of increasing mean particle diameter from the smallest mean particle diameter, even though the ingredients in the electrode material were the same as in the sample 4, except that two or more types of activated carbon particles with different mean particle diameters were used.

EXAMPLES 1 TO 7 AND COMPARATIVE EXAMPLES 1 AND 2

As shown in Table 2, 9 types of electrode materials were prepared using a PTFE dispersion and various rubber-based emulsions as a binder. Water was used in the smallest amount required for the electrode materials to maintain flowability (critical amount of electrode material to flow).

In Table 2, PTFE designates "PTFE dispersion" and IIR, NBR, SBR, and Acryl each denote rubber emulsions. Mixing methods are as described above.

Table 2 shows the solid content (% by weight) of the obtained electrode materials.

TABLE 2

|  | Binder | Activated carbon 1 | Activated carbon 2 | Conductive particulates | Surfactant | Mixing method | Solid content (% by weight) |
|---|---|---|---|---|---|---|---|
| Mixing ratio | 10 (solid content) | 35 | 35 | 20 | 0.2 |  |  |
| Example 1 | PTFE | particle diameter 15 μm | particle diameter 30 μm | DENKA BLACK | CMC | 2 | 45 |
| Example 2 | PTFE | particle diameter 30 μm | particle diameter 30 μm | DENKA BLACK | CMC | 2 | 40 |
| Example 3 | PTFE | particle diameter 15 μm | particle diameter 30 μm | DENKA BLACK | CMC | 3 | 40 |
| Example 4 | IIR | particle diameter 15 μm | particle diameter 30 μm | DENKA BLACK | CMC | 2 | 45 |
| Example 5 | NBR | particle diameter 15 μm | particle diameter 30 μm | DENKA BLACK | CMC | 2 | 45 |
| Example 6 | SBR | particle diameter 15 μm | particle diameter 30 μm | DENKA BLACK | CMC | 2 | 40 |

TABLE 2-continued

|  | Binder | Activated carbon 1 | Activated carbon 2 | Conductive particulates | Surfactant | Mixing method | Solid content (% by weight) |
|---|---|---|---|---|---|---|---|
| Example 7 | Acryl | particle diameter 15 μm | particle diameter 30 μm | DENKA BLACK | CMC | 2 | 45 |
| Comparative Example 1 | PTFE | particle diameter 15 μm | particle diameter 30 μm | DENKA BLACK | CMC | 1 | 20 |
| Comparative Example 2 | PTFE | particle diameter 15 μm | particle diameter 30 μm | DENKA BLACK | — | 1 | 20 |

Ingredients were mixed and dispersed at high speed for a predetermined period with a homogenizer manufactured by NIPPON SEIKI. The electrode materials and the binder were mixed at a low speed using a universal mixer manufactured by ODAIRA SEISAKUSHO, LTD. so that the binder might be fibrillated to a desired extent.

Subsequently, the obtained electrode materials were spread over a 50 μm aluminium etched foil with a roll coater, and dried at 180° C., giving a polarized electrode 150 μm thick after drying. A sufficient coating film was obtained in every case.

The obtained polarized electrodes were punched out into disk shapes of a diameter of 20 mm. Two disks were brought into contact with a separator sandwiched, and were immersed in a 1 molar propylene-carbonate solution of a tetraammonium tetrafluoroborate, and the resultant was filled into a coin type cell produced by HOUSEN SEISKUSHO, LTD., giving examination cells.

The obtained examination cells were charged at 2.5 V and 1 mA, DC for 15,000 seconds, and constant-current discharge at 1 mA was carried out. The capacitance of the polarized electrodes calculated from the charge period is shown in Table 3.

TABLE 3

|  | Capacitance (F) | Solid content (g/cm³) |
|---|---|---|
| Example 1 | 8.6 | 0.69 |
| Example 2 | 6.6 | 0.65 |
| Example 3 | 8.5 | 0.69 |
| Example 4 | 8.1 | 0.67 |
| Example 5 | 8.2 | 0.68 |
| Example 6 | 8.3 | 0.67 |
| Example 7 | 8.0 | 0.67 |
| Comparative Example 1 | 3.4 | 0.41 |
| Comparative Example 2 | 3.1 | 0.38 |

The polarized electrodes obtained in Examples 1 to 7 had a capacitance about 2 to 3 times larger than the polarized electrodes obtained in comparative examples 1 and 2.

INDUSTRIAL APPLICABILITY

According to the preparation method of the invention, electrode materials of reduced viscosity compared to the conventional electrode materials can be prepared even when the amount of solid-content is the same.

The electrode materials of the invention can produce, as compared to conventional polarized electrodes, polarized electrodes that ensure a favorable packing ratio of the activated carbon particles and conductive particulates contained in the polarized electrodes and a satisfactory contact between these and the electrolyte, and demonstrate excellent capacitance.

Polarized electrodes of the present invention obtained by forming an electrode layer on a conductive substrate using the electrode material of the invention have capacitance about 2 to 3 times greater than conventional polarized electrodes.

The polarized electrodes of the invention having such characteristics are particularly useful for polarized electrodes of electric double layer capacitors.

The invention claimed is:

1. A method for preparing an electrode material for a polarized electrode, the method comprising:
    a first step of dispersing conductive particles and a surfactant in water;
    a subsequent second step of dispersing activated carbon particles, different from the conductive particles, in the dispersion obtained in the first step; and
    a third step of mixing a binder comprising a rubber containing emulsion or a dispersion of polytetrafluoroethylene in the dispersion obtained in the second step.

2. A preparation method according to claim 1, wherein at least two types of activated carbon particles with different mean particle diameters are used.

3. A preparation method according to claim 2, wherein the at least two types of activated carbon particles are dispersed in the dispersion in the second step in the order such that the type of activated carbon particles with the smallest mean particle diameter is dispersed first, and then a) the other type of activated carbon particles is dispersed or b) the other types of activated carbon particles are dispersed in order of their increasing mean particle diameter.

4. A method according to claim 1, wherein the conductive particles have a mean particle diameter of 0.01-20 μm.

5. A method according to claim 2, wherein the next smallest activated carbon particles have a mean particle diameter which is three times that of the smallest activated carbon particles.

6. A method according to claim 1, wherein the mixed dispersion obtained in the third step is flowable and has a solid content of 25% by weight or more.

7. A method according to claim 1, further comprising a fourth step of applying the mixed dispersion obtained in the third step on a substrate, followed by drying.

8. The method of claim 1, further comprising a fourth step of drying the electrode material to substantially remove the water, thereby generating voids between at least a portion of the binder and the activated carbon.

* * * * *